Oct. 22, 1957 A. EISELE 2,810,202
ALIGNMENT AND CONCENTRICITY GAUGE
Filed May 9, 1952
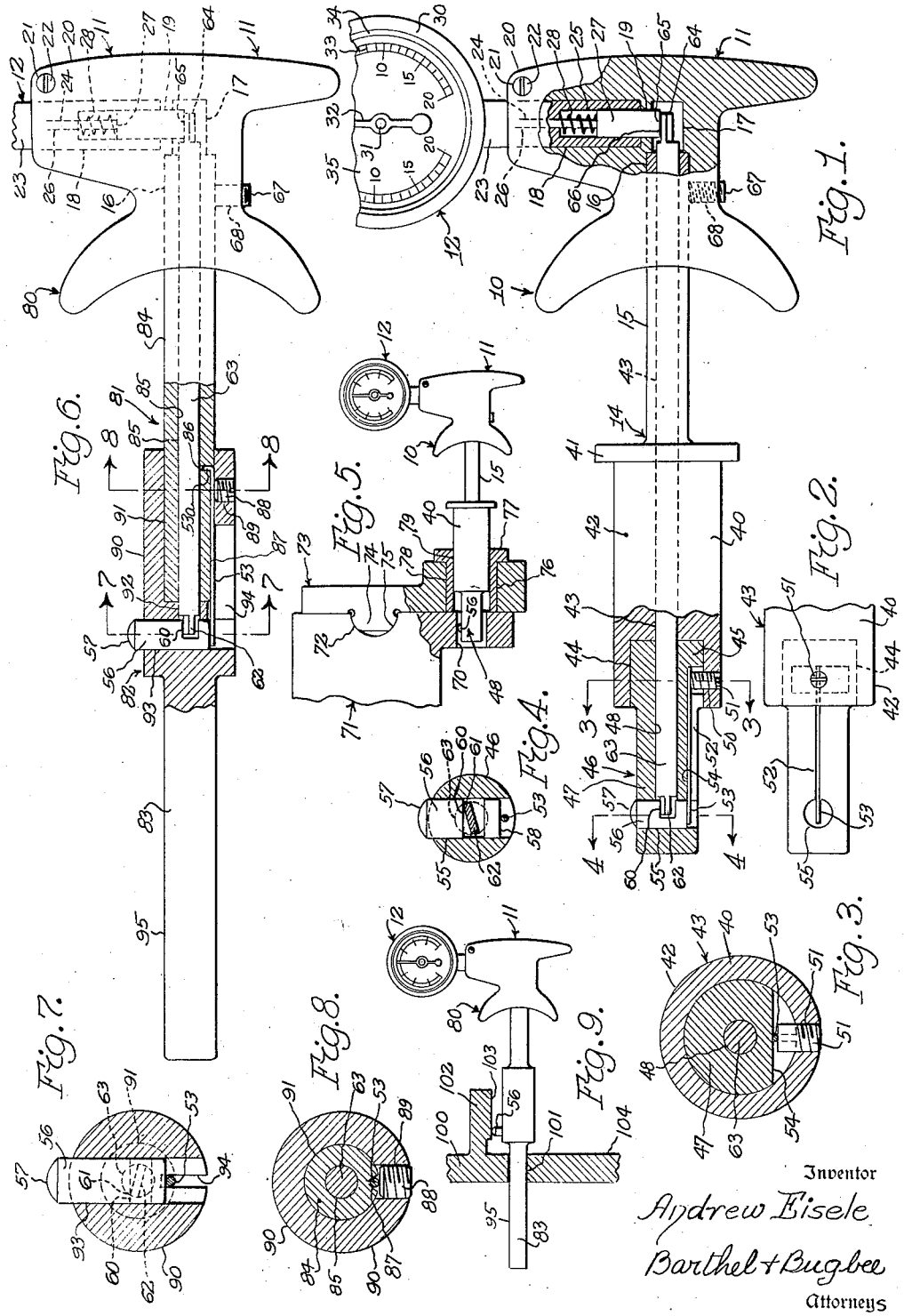
Inventor
Andrew Eisele
Barthel + Bugbee
Attorneys United States Patent Office 2,810,202
Patented Oct. 22, 1957

2,810,202

ALIGNMENT AND CONCENTRICITY GAUGE

Andrew Eisele, Detroit, Mich.

Application May 9, 1952, Serial No. 287,071

1 Claim. (Cl. 33—172)

This invention relates to bore gauges and, in particular, to alignment and concentricity gauges.

One object of this invention is to provide an alignment and concentricity gauge by means of which the locations of bores in a workpiece may be accurately determined, and their deviation, if any, from their intended locations precisely measured.

Another object is to provide an alignment and concentricity gauge of the foregoing character having a pilot portion combined therewith and located either preceding or following the measuring pin of the bore gauge, depending upon the type of bore to be measured and the character of the workpiece.

Another object is to provide an alignment and concentricity gauge of the foreging character which can be used to determine the correctness of bores in a workpiece relatively to a locating part of the workpiece so that the amount, if any, by which the bore is off position relatively to the locating part can be accurately measured.

Another object is to provide a modified alignment and concentricity gauge of the foregoing character which can be used to accurately measure the location of a surface on a projection of a workpiece relatively to a bore in the workpiece in which a pilot portion of the bore gauge is inserted, the surface to be checked being preferably substantially parallel to the axis of the bore.

Other objects and advantages of the invention will become apparent during the course of the following description of the accompanying drawings, wherein:

Figure 1 is a side elevation, partly broken away in central vertical section, of an alignment and concentricity gauge according to one form of the invention, having a pilot portion following the measuring pin;

Figure 2 is a bottom plan view of the forward portion of the gauge shown in Figure 1;

Figure 3 is a cross-section taken along the line 3—3 in Figure 1;

Figure 4 is a cross-section taken along the line 4—4 in Figure 1;

Figure 5 is a reduced size diagrammatic view showing the gauge of Figure 1 in use for checking the position of a bore in a workpiece relatively to a locating part thereon;

Figure 6 is a side elevation, partly in central vertical section, of a modified alignment and concentricity gauge having a pilot portion preceding the measuring pin;

Figure 7 is a cross-section taken along the line 7—7 in Figure 6;

Figure 8 is a cross-section taken along the line 8—8 in Figure 6; and

Figure 9 is a reduced size diagrammatic view similar to Figure 5, showing the modified gauge of Figure 6 in use for checking the location of a surface relatively to a bore in which the pilot is inserted.

Referring to the drawing in detail, Figure 1 shows an alignment and concentricity gauge, generally designated 10, according to one form of the invention as consisting generally of a handle 11 upon which is mounted a conventional dial indicator 12 and also one end of the gauge measuring unit 13. In particular, the gauge measuring unit 13 is mounted in a tubular housing 14 having a reduced diameter portion 15 which is received within a socket or bore 16 of corresponding diameter in the handle 11. Beyond the bore 16 there is provided a counterbore or smaller socket 17 of smaller diameter than the bore 16. Opening into the counterbore 17 with its axis substantially at right angles to the axis of the bore 16 and counterbore 17 is a bore or socket 18 having a counterbore 19 extending therefrom into the counterbore 17.

Immediately to the right of the bore 18, the projecting portion 20 of the handle 11 which contains the bore 18 is provided with a slot (not shown) extending from the bore 18 to the outside of the handle 11. The handle portion 20 is provided with a screw hole 21 crossing the slot at right angles and has a clamping screw 22 threaded therein for pulling together the parts of the handle portion 20 located on opposite sides of the slot.

Seated in the bore 18 and clamped tightly in position by means of the clamping screw 22 in the slotted handle portion 20 is the tubular stem 23 of the dial indicator 12. The stem 23 is bored longitudinally as at 24 and counterbored as at 25 (Figure 1) to receive the motion-transmitting rod 26 and head 27 respectively. A compression spring 28 urges the head 27 downward through the counterbore 19 into the counterbore 17. The motion-transmitting rod 26 passes upward through the bore 24 into the gauge casing 30 and engages the usual multiplying mechanism contained therein. This mechanism terminates in the needle shaft 31 carrying the needle or pointer 32 registering with the measuring scale 33 mounted on a rotary dial 34 covered by the usual crystal 35. The dial indicator 12 and its mechanism just described are conventional and well-known to makers and users of gauges, and its details lie outside the scope of the present invention. The dial 34 is made rotatable in order to set the zero graduation of the scale 33 properly relatively to the needle 32 in the usual and well-known manner.

The tubular housing 14, in addition to the reduced diameter portion 15, is provided with an enlarged diameter pilot portion 40 separated from the reduced diameter portion 15 by an annular flange 41. The pilot portion 40 is provided with a substantially cylindrical pilot surface 42, and coaxial with this surface and with the reduced diameter portion 15 is a longitudinal bore 43 extending lengthwise through the portions 40 and 15 (Figure 1). At its inner end, the bore 43 opens into the counterbore 17 whereas at its outer end its opens into a cylindrical socket or counterbore 44 which receives the cylindrical rearward portion 45 of a measuring head 46, the forward portion 47 of which is of slightly smaller diameter than the rearward portion 45. The measuring head 46 contains a bore 48 of the same diameter and coaxial with the bore 43 in the gauge housing 14.

The forward end of the pilot portion 42 is provided with a transverse screw hole 50 which receives a headless set screw 51, the inner end of which passes into a slot or recess 52 in the measuring head 46 (Figure 3) where it engages the rearward end of a leaf spring in the form of a spring wire 53 which in turn engages the bottom 54 of the recess 52. The recess 52 extends forwardly parallel to the axis of the bore 48 for the major portion of the length of the reduced diameter portion 47, and opens into a transversely-disposed measuring pin bore 55, the axis of which is disposed substantially at right angles to the axis of the bore 48. Reciprocably mounted in the bore 55 is a measuring pin 56 having a rounded outer end 57 and a flat inner end 58 engaged by the forward end of the spring 53. The measuring pin 55 is provided with a transverse slot, one shouldered side 60 of which serves as a contact surface for the corner 61 of a flat portion 62 upon the end of a motion-transmitting rod 63 which is rotatably mounted in the bores 48 and 43. The inner or rearward end of the motion-transmitting rod 63 is provided with a similar flat portion 64 likewise having a corner edge 65 which in this instance engages the end 66 of the dial indicator head 27. The reduced diameter portion 15 of the tubular housing 14 is secured in the handle socket or bore 16 by a set screw 67 threaded into the transverse threaded hole 68.

In the operation of the alignment and concentricity gauge 10 of Figures 1 to 5 inclusive, let it be assumed that the location and concentricity of a hole 70 in a workpiece 71 is to be determined relatively to a locating portion 72 therein, a spherical recess 72 being shown for purposes of illustration. To determine this accurately, use is made of a fixture 73 having a projection 74 with a spherical surface 75 snugly fitting the spherical recess 72, the fixture 73 also having a bore 76 containing a hardened steel bushing 77, the outer surface 78 of which snugly fits the bore 76 and the inner surface 79 snugly fits the outer surface 42 of the pilot portion 40 of the gauge 10. The fixture 73 is so constructed that the distance from the central axis of the projection 72 to the central axis of the bushing bore 79 is precisely that desired for the distance from the central axis of the recess 72 to the central axis of the bore 70 in the workpiece 71.

To determine the deviation if any from these standard dimensions, the operator inserts the pilot portion 40 of the gauge 10 into the bore 79 and then carefully inserts the projection 74 into the recess 75 as he pushes the measuring head 46 into the bore 70. As the side wall of the bore 70 engages the rounded end 57 of the measuring pin 56, it pushes the latter inward, causing the shoulder 60 to engage the corner edge 61 of the flattened portion 62 and accordingly to rotate the motion-transmitting rod 63, the flattened portion 64 at the other end thereof transmitting the motion to the dial indicator head or plunger 27. This motion is transmitted through the mechanism of the dial indicator 12 to the needle shaft 31 thereof, swinging the needle 32 if the location of the bore 70 differs from standard. Any deviation thereof is indicated in measurement units, such as thousandths of an inch, upon the graduated scale 33, it of course being assumed that the scale has previously been set to zero with the needle 32 by rotating the dial 34 with the measuring head 46 placed in a suitable standard bore for zero setting purposes. The operator now rotates the gauge 10 by rotating the handle 11 thereof in order to rotate the measuring head 46 within the bore 70. If the latter is not exactly coaxial with the bushing bore 79, the measuring pin 56 will move in and out as the gauge is rotated, causing the needle 32 to move back and forth and indicating lack of coaxiality or concentricity. During these measurements, the spring 53 of course tends to move the measuring pin 56 outward so as to maintain the rounded portion 57 thereof in contact with the surface of the bore being measured.

The modified alignment and concentricity gauge, generally designated 80, shown in Figures 6 to 9 inclusive possesses similar mechanism to that shown in Figures 1 to 5 inclusive and similar parts thereof are accordingly similarly designated. In order to conserve space, the dial indicator 12 in Figure 6 has been omitted except for its stem 23 and the mechanism contained therein. Accordingly, no repetition of the description of this mechanism is needed. In the modified gauge 80, however, the housing 81 and measuring head 82 differ from the housing 14 and measuring head 46 chiefly in that the pilot portion 83 of the modified gauge 80 precedes the measuring pin 56, whereas in Figures 1 to 5 inclusive, the pilot portion 40 follows the measuring pin 56.

In particular, the modified housing 81 now consists of a tubular shaft 84 having its rearward end seated as before in the socket or bore 16 of the handle 11 and secured therein by the set screw 67. The tubular shaft 84 also has a longitudinal bore 85 running from end to end thereof and corresponds to the bore 43 in the gauge 10 in that it rotatably receives the motion-transmitting rod 63 as before. The forward portion of the tubular shaft 84 contains a transverse hole 86 opening into a longitudinal groove 87 (Figure 8) leading to the end thereof and accommodating the spring 53 which, however, is here provided with a right-angled bend or projection 53a anchored in the hole 86.

The spring 53 is locked in position by a set screw 88 threaded into a transverse hole 89 in the cylindrical body 90 of the measuring head 82, the body 90 having a cylindrical socket or bore 91 snugly receiving the tubular shaft 84. The latter is also locked in position by the set screw 88 through the intermediate action of the spring 53. The forward end of the bore 91 contains a counterbore 92 extending therefrom into the transverse bore 93 slidably containing the measuring pin 56. The measuring head body 90 contains a slot 94 communicating with the groove 87 and permitting flexing of the spring 53 (Figure 7). The pilot portion 83, as previously stated, extends forward from and precedes the body 90 of the measuring head and has an outer surface 95 which is of the desired diameter for insertion in a standard bushing, as described in connection with the operation.

In the operation of the modified alignment and concentricity gauge 80 of Figures 6 to 9 inclusive, let it be assumed (Figure 9) that a workpiece 100 has a bore 101 and a projection 102 with a surface 103 substantially perpendicular to the surface 104 to which the axis of the bore 101 is perpendicular. Let it be assumed that the position of the surface 103 and bore 101 are to be checked relatively to one another and that the pilot portion 83 of the gauge 80 snugly fits the bore 101 or, if not, that a hardened steel precision bushing (not shown) is inserted in the bore 101 with its inner surface snugly engaging the cylindrical surface 95 of the pilot portion 83.

In checking the workpiece 100, the operator grasps the handle 11 of the modified gauge 80 and carefully inserts the pilot portion 83 into the workpiece bore 101 or into the bore of the bushing inserted therein, as the case may be, watching the measuring pin 56 as its rounded portion encounters and moves along the surface 103 of the projection 102. If the bore 101 and surface 103 are accurately parallel to one another, the needle will remain immovable once the measuring pin 56 engages the surface 103, although it will indicate a reading on the scale 33 which is away from zero if the distance of the surface 103 from the axis of the bore 101 is not the standard or desired distance.

If, however, the bore 101 and the surface 103 are not parallel to one another, the needle 32 will move along the scale 33 as the measuring pin 56 moves along the surface 103 while the pilot portion 83 is moving farther into the bore 101. If the bore 101 is not straight, the pilot portion will indicate that the bore is crooked by binding in the bore and ceasing to continue its penetration of the bore. It will also be evident from Figure 9 that 103 can also represent the wall or surface of a counterbore the concentricity or alignment of which can be checked relatively to the bore 101 in the manner just described.

What I claim is:

A gauge for measuring the diameter of an extremely small-diameter cylindrical bore by means of a dial indicator, said gauge comprising an elongated supporting shaft having a longitudinal bore therethrough, said shaft near its rearward end having a dial indicator receiving portion and at its forward end having a reduced diameter portion, said reduced-diameter portion having a transverse bore therethrough with its axis disposed perpendicular to the axis of said longitudinal bore and intersecting the forward end of said longitudinal bore, an elongated motion-transmitting rod movably mounted in said longitudinal shaft bore and at its rearward end operatively engageable with a dial indicator mounted in said dial indicator receiving portion, a transversely-movable measuring pin reciprocably mounted in said transverse bore with its forward end projecting from the forward end thereof and with its rearward end disposed near the rearward end thereof, said measuring pin intermediate its forward and rearward ends operatively engaging the forward end of said motion-transmitting rod, said reduced diameter portion having an elongated longitudinal recess therein extending from a location rearwardly of said transverse bore forwardly along said shaft into the rearward end of said transverse bore, and an elongated substantially straight leaf spring secured at its rearward end in the rearward end of said recess and extending longitudinally therealong with its forward end projecting into the rearward end of said transverse bore and resiliently engaging and urging forwardly the rearward end of said measuring pin.

References Cited in the file of this patent

UNITED STATES PATENTS

| | | |
|---|---|---|
| 1,048,073 | Hirth | Dec. 24, 1912 |
| 1,416,694 | De Leeuw | May 23, 1922 |
| 1,420,951 | Bartholdy | June 27, 1922 |
| 1,891,365 | Albertson | Dec. 20, 1932 |
| 1,972,124 | Aldeborgh et al. | Sept. 4, 1934 |
| 2,192,900 | Eisele | Mar. 12, 1940 |
| 2,232,340 | Olson | Feb. 18, 1941 |
| 2,268,579 | Eisele | Jan. 6, 1942 |
| 2,518,229 | Fox | Aug. 8, 1950 |
| 2,600,498 | Hammerly | June 17, 1952 |

FOREIGN PATENTS

| | | |
|---|---|---|
| 640,692 | Germany | Jan. 9, 1937 |
| 695,927 | Germany | Aug. 8, 1940 |
| 584,304 | Great Britain | Jan. 10, 1947 |